United States Patent [19]

Blomberg

[11] 3,760,122

[45] Sept. 18, 1973

[54] SWITCHING DEVICE FOR TELEPHONE INSTRUMENTS

[76] Inventor: Knut Hugo Blomberg, Lakattsrager 39, 161 37 Bromma, Sweden

[22] Filed: Feb. 23, 1971

[21] Appl. No.: 118,025

[30] Foreign Application Priority Data

Feb. 27, 1970 Sweden .............................. 2659/70

[52] U.S. Cl. .......... 179/99, 179/18 BD, 179/100 R, 179/147

[51] Int. Cl. ......................... H04m 1/04, H04m 1/72

[58] Field of Search ............... 200/85 R; 179/100 R, 179/100 C, 100 D, 103, 146 R, 178, 18 BD, 18 BE, 99, 147

[56] References Cited

UNITED STATES PATENTS

| | | | |
|---|---|---|---|
| 2,419,388 | 4/1947 | Blomberg et al. | 179/103 |
| 3,548,117 | 12/1970 | Blomberg | 179/146 R |
| 3,426,160 | 2/1969 | Ring | 179/100 D |
| 2,910,538 | 10/1959 | Aleksa | 179/103 |
| 2,405,543 | 8/1946 | Blomberg | 179/103 |
| 2,183,744 | 12/1939 | Hubbell | 179/100 D |
| 3,636,547 | 1/1972 | Brace et al. | 200/85 R |
| 3,156,771 | 11/1964 | Vaughn | 179/1 C |
| 3,100,818 | 8/1963 | Carter | 179/1 C |
| 2,812,422 | 11/1957 | Provi | 200/85 R |
| 2,657,265 | 10/1953 | Branson et al. | 179/1 C |
| 2,586,910 | 2/1952 | Bolle | 200/85 R |
| 2,549,929 | 4/1951 | Rehfeldt | 200/85 R |

FOREIGN PATENTS OR APPLICATIONS

| | | | |
|---|---|---|---|
| 720,111 | 2/1932 | France | 179/100 D |

*Primary Examiner*—Kathleen H. Claffy
*Assistant Examiner*—Randall P. Myers
*Attorney*—Burns, Doane, Swecker & Mathis

[57] ABSTRACT

A switching device for a telephone instrument with a base support surface for the telephone instrument and a number of switching contacts, said contacts, together with the contacts comprised in the telephone instrument, being operated when the instrument is placed on said support surface, said contacts being adapted upon operation to perform certain desired functions, such as to connect the incoming line to an extension line.

9 Claims, 8 Drawing Figures

SWITCHING DEVICE FOR TELEPHONE INSTRUMENTS

BACKGROUND OF THE INVENTION

In the usual telphone instruments, the handset comprises only the earphone and the microphone. In some telephone instruments, especially in telephone instruments of the so called upright-standing type, the handset comprises also the rest of the equipment belonging to the instrument, viz. some switching contacts and the finger dial. This specific character of such telephone instrument, viz. its easy movability together with its own switching contacts, as compared to a telephone instrument of an ordinary type, where the switching contacts are located in the stationary part of the instrument, is utilized in the present invention for providing a switching device of a very simple convenient type for performing additional connecting functions which may be desired when a telephone call is received or initiated from the instrument.

SUMMARY OF THE INVENTION

The invention relates to a switching device for a telephone instrument with switch contacts belonging to said instrument and adapted to be operated when the instrument is placed on a support for the instrument, wherein a base support unit is provided with a support surface for said telephone instrument and with switching contacts, said switching contacts being adapted to be operated together with the operation of the switch contacts belonging to said instrument, when said instrument is placed on the support surface of said base support.

Switching devices for ordinary telephone instruments are already known which, for example, are provided with a push button operated switch, e.g. a switch, mechanically connected to the handset and adapted to be actuated when the handset is lifted. It is also known to place a switching device under the telephone set, said switching device being actuated by the change in weight of the set, when the handset is lifted. The device according to the present invention is distinguished from such known devices by being a quite separate unit which is taken in use only when a certain special switching function is wanted, and in which said switching function is brought about by the simultaneous operation of both the switch normally belonging to the telephone instrument and the switch in the base support.

SHORT DESCRIPTION OF THE DRAWING

In the drawing,

FIG. 1 is a simplified illustration of a telephone instrument of the upright-standing type, FIG. 2 is a simplified illustration of a switching device according to the present invention, FIG. 3 is a simplified illustration of a section through the device illustrated in FIG. 2, FIG. 4 is a modified form of a switching device according to the invention, FIG. 5 is a simplified illustration of a section of the device according to FIG. 4, FIG. 6 is an illustration of a further modification of the switching device according to the present invention for mounting on a wall as a shelf for the telephone instrument, FIG. 7 is a simplified circuit diagram illustrating how the switching instrument according to the present invention can be utilized for connecting an incoming call to another telephone instrument, for example to an instrument belonging to a secretary or the like, FIG. 8 illustrates a modification of the circuit diagram shown in FIG. 7 in which also the secretary's telephone instrument has a switching device according to the invention by means of hich the circuit can be so modified that, when the secretary is out, the calling signal is received at the telephone instrument of the company executive in spite of the fact that the line is extended to the secretary.

DETAILED DESCRIPTION OF THE INVENTION WITH REFERENCE TO THE DRAWING

Figure 1:
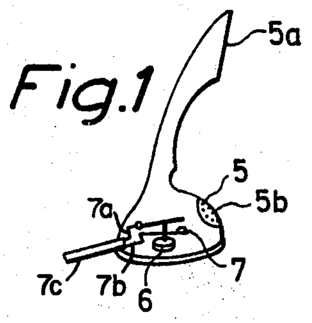

In FIG. 1 there is briefly illustrated a telephone instrument 5 of the upright-standing type. Said telephone instrument has an earphone 5*a* and a microphone 5*b*. In the bottom of the instrument there is located a finger dial (not illustrated) and a push button 6 which operates a switching contact device 7. When the instrument is kept by the hand, the push button 6 projects from the bottom surface of the instrument and the swiching contacts 7 are unoperated, such that the wires 7*a* and 7*b* of the input line 7*c* are electrically connected when the instrument is placed on a support surface, such as a desk surface or the like, the push button 6 is pressed inwards into the instrument and the switching contacts 7 are operated so as to disconnect the wires 7*a* and 7*b*.

Figure 2:
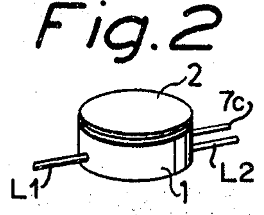
Figure 3:
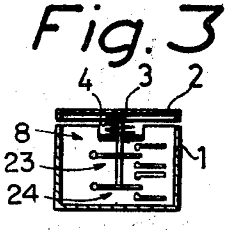

In FIGS. 2 and 3 there is shown a base support according to the invention, said base support comprising a cylindrical housing 1 with an upper circular plate 2 which is connected to the housing by a rod 3. By means of a spring 4 the plate 2 is kept in an elevated position above the upper end of the housing 1. When the upright-standing telephone instrument 5 is standing on a support surface, for example an office desk, the push button 6 is depressed towards the bottom surface of the instrument. When the telephone is lifted from said desk and placed on said plate 2 of said base support, the push button 6 is first pushed out of the bottom surface of the instrument and then depressed again so that the contacts 7 comprised in the instrument are restored to the same position as they had when the instrument was standing on the desk. At the same time, the plate 2 is pressed downwards and through the rod 3 and contacts 23 and 24 of the contact arrangement 8 of the base support are operated. When the telephone is lifted from the base support, the plate 2 and the contacts 23 and 24 of the contact arrangement 8 will be restored to their original positions.

Figure 4:
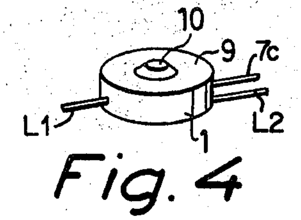
Figure 5:
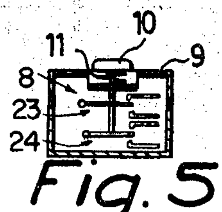

The base support according to FIG. 4 has a substantially stationary support surface 9 for the telephone instrument instead of the movable support surface 2 in FIG. 2. The stationary support surface 9 forms the upper side of the housing 1. In the central part of said support surface there is a switch button 10, which by the action of a spring 11 is elevated from the upper surface 9. When the telephone is placed on the base support the button 10 will be depressed to the same level as the upper surface 9 and thereby the contacts 23 and 24 will be operated and at the same time the contacts 7 comprised in the telephone instrument will be operated.

When the telephone instrument is placed on the base support it will be in an elevated position in relation to the position it has when it is standing on a desk and thereby it will be indicated for the user in a simple way that the switching device is put into use. By choosing different colours of the telephone and the base support, this effect may be emphasized.

The base support illustrated in FIGS. 2 and 4 has circular support surfaces for the desk instrument and because of that it is easy to place the instrument on the base support regardless of from which side that is done. The height of the base support should be determined by considering the fact, that while the base support unit should not be too spacious, it should have a sufficient height to give to the telephone a position which is clearly different from its normal position so that a clear indication as referred to in the foregoing is obtained.

As a rule the base support will have a greater volume than what is required for enclosing the contact switch arrangement 8. Therefore, it may be suitable to mount other equipments belonging to the telephone in the base support, such as for example a signalling device, comprising a bell or a buzzer, one or more pilot lamps and so on. But also other equipments such as manually operated switches, loudspeakers, electronical equipment of different kinds, for example amplifiers, which by utilizing modern technique can be of very small dimensions and require small space, may be located in the base support. In such cases it may be preferable to choose another form for the base support than the simple cylindrical form illustrated in FIGS. 2 and 4 and adapt the outer shape of the base support to the requirements of the equipments comprised therein.

Figure 6:
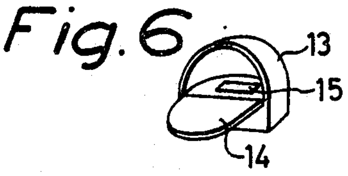

The base support shown in FIGS. 2 – 5 are intended for being placed on a desk. A base support according to the invention can, however, also be adapted to be mounted on a wall and may then for example be formed as described in the Swedish patent application 226.672 in which a shelf for upright-standing telephone instruments is illustrated. In FIG. 6 such a shelf is briefly shown. It comprises a holder 13 fastened to the wall and a foldable lid 14 on which the telephone instrument should be placed, when the lid is foled out as shown. When the bottom part of the instrument is pushed into the holder, it presses down a push button 15 which is spring actuated and which operates a contact switch mounted inside the holder.

Figure 7:
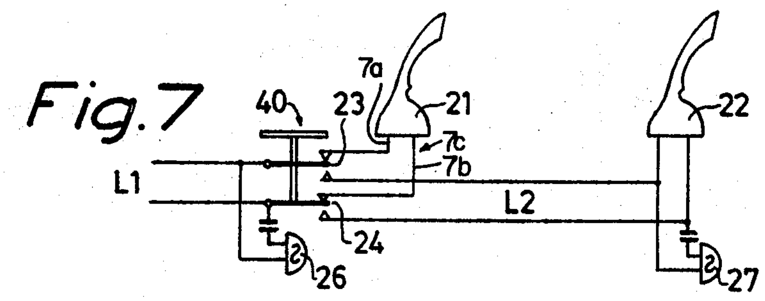

FIG. 7 is a circuit diagram illustrating one example of the use of the present invention. The circuit shown in FIG. 7 illustrates the use of a switching device for switching over a telephone line between two telephone sets. A need for such overswitching occurs frequently in offices, when one user of a telephone wants that his incoming calls should be connected to another telephone set, for example the telephone set of a secretary, when the user is not in his room or when he does not want to answer the telephone call himself.

$L_1$ designates a telephone line normally leading to a first telephone instrument 21 which is, for example, supposed to be the telephone instrument of an office executive. $L_2$ designates the line going to a second telephone instrument 22, belonging to a secretary. The line $L_1$ passes two change over contacts 23 and 24 belonging to the switching contacts in a base support 40 of, for example, the type illustrated in FIG. 2. When the instrument 21 stands on the desk, it is functioning in a normal way. When a call arrives, the bell or call signal transducer 26 will be ringing. The line $L_2$ is disconnected from the line $L_1$ and from the instrument 21. When the user of the telephone 21 wants to send the incoming call to the telephone 22 he places his instrument 21 on the base support 40 and thereby the line $L_1$ will be connected to the line $L_2$ and to the instrument 22. By said instrument calls may be received and calls may be made in a normal way as long as the instrument 21 is placed on the base support 40. When a call arrives, both the bell 26 located near the telephone 21 and the bell or call ignal transducer 27 located near the telephone 22 will be ringing.

It is of course also possible to modify the circuit so that the signal bell of the telephone instrument 21 will be disconnected when the extension line $L_2$ is connected to the line $L_1$. It is also possible to connect additional signalling devices to the line $L_1$ and/or to the line $L_2$.

Figure 8:
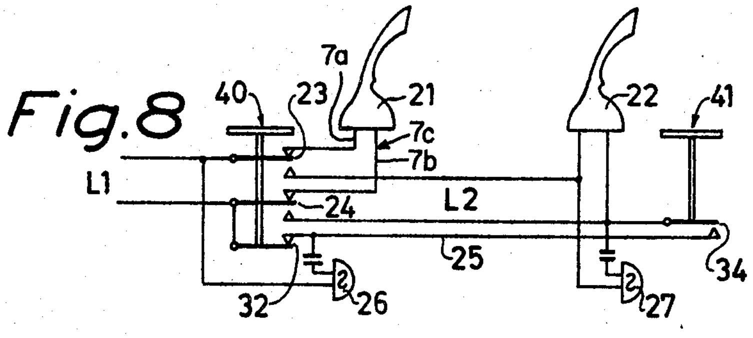

If a base support is provided also for the telephone instrument 22, belonging to the secretary, as illustrated in FIG. 8, where such a base support is designated by the reference numeral 41, said base support may be used for providing an indication at the telephone instrument 21 when the secretary is not able to receive a call which has been transmitted to him. When the telephone instrument 21 belonging to the executive is placed on the base support 40, the line $L_1$ is connected to the telephone instrument 22 belonging to the secretary and at the same time the signal bell 26 is disconnected by means of the contact 32. If the secretary is forced to leave his room or if there is any other reason why he cannot receive a call, he sould place his telephone instrument 22 on the base support 41 whereby a contact 34 in said base support is closed. Then the signal bell 26 located (for example inside the base support 40) near the instrument 21 belong to the executive is connected to the line $L_1$ over said contact 34. If a signal arrives over the line $L_1$ the signal bell 26 of the instrument 21 will be brought to operate in spite of the fact that the telephone instrument 21 is placed on the base support 40, and thereby the user of the telephone 21 is informed that the call cannot be received by the secretary.

A similar device with base supports provided at both telephone instruments can also be used, when it is wanted to alternately use two incoming lines for two separate users.

The invention may be applicable to may other coupling processes than the ones shown in the foregoing, for example for switching over the equipment to loudspeaker telephone, for switching in a telephone answering machine or the like.

What I claim is:

1. In combination, a base support unit for a telephone instrument of the uprightstanding type, said base support unit being mechanically separate from the telephone instrument; said telephone instrument having a first electrical contact set which is actuated by a press button located in the bottom of said instrument; said press button being adapted to be depressed when said instrument is placed on a support surface such as a table or office desk; said base support unit having a second contact set which is actuated by a movable part of said base support unit when the telephone instrument is placed thereon; and electrical circuit means connecting said second contact set and said telephone instrument for establishing a condition of operation of said telephone instrument and said second contact set in response to combined actuation of said second contact set and depression of said button when said telephone instrument is placed on said base support unit which condition is different from any of the conditions of operation obtained when the telephone instrument is either lifted from a support surface or resting on a support surface other than said base support unit.

2. The combination as claimed in claim 1 including a second telephone instrument and an extension line having one end connnected to said second telephone instrument; and means including said second contact set for connecting an incoming line from a telephone exchange station to said second telephone instrument through said extension line, thereby defining said condition of operation established in response to combined actuation of said second contact set and depression of said button.

3. The combination as claimed in claim 2 further having call signal transducers located at each of said telephone instruments, and circuit means for permanently connecting the call signal transducer at the first telephone instrument to the incoming telephone line and for connecting the transducer at the second telephone instrument to the incoming telephone line only when the first telephone instrument is located on said base support unit.

4. The combination as claimed in claim 2 further having call signal transducers at each of said telephone instruments, and circuit means for permanently connnecting the transducer associated with the second telephone instrument to said extension line and for selectively connecting the transducer associated with the first telephone instrument to the incoming telephone line through said second contact set to thereby provide for selective connection of the transducer for said first telephone instrument.

5. The combination as claimed in claim 4 together with a second base support unit positioned at the location of said second telephone instrument; said second base support unit having a third contact set; and circuit means including said third contact set for connecting the first telephone instrument transducer to the incoming telephone line regardless of whether the first telephone instrument is placed on its associated base support unit.

6. The combination as claimed in claim 5 wherein the height of a telephone instrument supporting surface on each of said base support units relative to a support surface for carrying an associated telephone instrument is sufficient to make clearly distinguishable the telephone instruments in their elevated positions on said base support units and the telephone instruments in their lower position when standing directly on said support surface for carrying the associated base unit, to thereby render a clear visual indication to the user the circuit condition of the telephone which is prevailing.

7. The combination as claimed in claim 1 wherein the eight of a telephone instrument supporting surface on aaid base support unit relative to a support surface for carrying the telephone instrument is sufficient to make clearly distinguishable the telephone instrument in its elevated position on said base support unit and the telephone instrument in its lower position when standing directly on said support surface for carrying the telephone instrument, to thereby render a clear visual indication to the user the circuit condition of the telephone which is prevailing.

8. In combination, a telephone of the uprightstanding type, a base support member for the telephone instrument, and an auxiliary communication instrument; said base support unit being mechanically separate from the telephone instrument; said telephone instrument having a first contact set which is actuated by a press button located in the bottom of said instrument; said press button being adapted to be depressed when said instrument is placed on a support surface such as a table or office desk; said base support member having a second contact set which is actuated by a movable part of said base support unit when the telephone instrument is placed thereon; and first electrical conductor means interconnecting said second ontact set and said telephone instrument for closing a first circuit between said telephone instrument and a communication station remote therefrom when said telephone instrument is lifted from the support surface; and second electrical conductor means interconnecting said second contact set and said auxiliary communication instrument for closing a second circuit between said auxiliary communication instrument and a communication station remote therefrom in response to combined actuation of said second contact set and depression of said button when said telephone instrument is placed on said base support.

9. In a telephone apparatus comprising an uprightstanding telephone instrument having receiving and transmitting means; a base support unit for the telephone instrument and mechanically separate therefrom; and an auxiliary communication instrument; the improvement wherein:

said telephone instrument having an instrument contact set which includes an actuating press button operably connected to said instrument contact set and located in the bottom of said telephone instrument;

said press button being arranged to be depressed by depressing forces, as caused by said telephone instrument being placed on a support surface to shift said telephone instrument contact set into a first instrument contact position, said press button being arranged to be extended in the absence of depressing forces, as caused by said telephone instrument being lifted from said support surface, to shift said telephone instrument contact set into a second instrument contact position;

said base support unit having a base contact set including a movable actuating base portion operably connected to said base contact set;

said movable portion being arranged to shift said base contact set into a first base contact position in response to a shifting force, as caused by said telephone instrument being placed onto said base unit;

said movable portion being arranged to shift said base contact set into a second base contact position in response to the absence of a shifting force, as caused by said telephone instrument being lifted from said base unit;

first selectively closable circuit-defining means, including said base contact set, said telephone instrument contact set, and means electrically connecting said base contact set to said instrument contact set, for operably connecting said telephone instrument to a communication station remote therefrom;

second selectively closable circuit-defining means, including said base contact set, said auxiliary communication instrument, and means electrically connecting said base contact set to said auxiliary communication instrument, for operably connecting said auxiliary communication instrument to a communication station remote therefrom;

said telephone instrument, said auxiliary communication instrument, and said base unit being arranged such that:

with said instrument contact set being in said first instruent contact position, and said base contact set being in said second base contact position, said telephone apparatus is in a single ringing condition;

with said instrument contact set being in said second instrument contact position, and said base contact set being in said second contact position, said first circuit-defining means is closed; and with said instrument contact set being in said first instrument contact position and said base contact set being in said first base contact position, said second circuit-defining means is closed.

* * * * *